Figure 1:
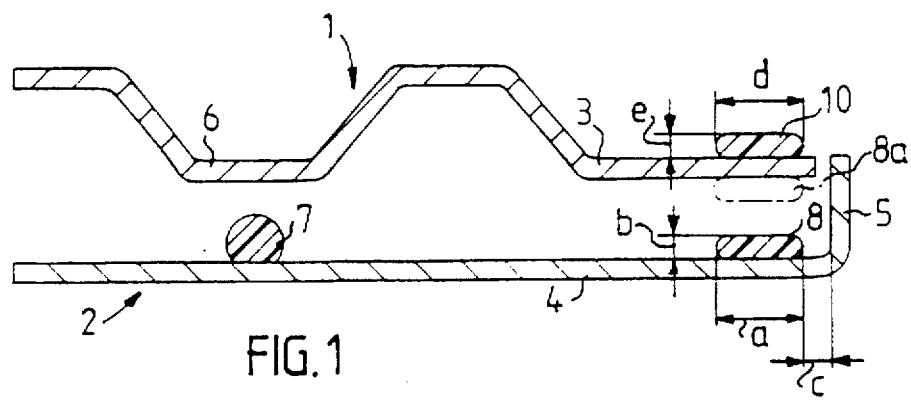

United States Patent [19]

Eklund et al.

[11] Patent Number: 5,749,992

[45] Date of Patent: May 12, 1998

[54] PROCESS FOR PRODUCING AN ADHESIVE BOND IN A FOLDER JOINT

[75] Inventors: Karl-Gunnar Eklund; Tommy Mattsson, both of Kyrkhult, Sweden

[73] Assignee: AB Volvo, Gothenburg, Sweden

[21] Appl. No.: 535,197

[22] PCT Filed: Mar. 24, 1994

[86] PCT No.: PCT/SE94/00266

§ 371 Date: Sep. 20, 1995

§ 102(e) Date: Sep. 20, 1995

[87] PCT Pub. No.: WO94/21740

PCT Pub. Date: Sep. 29, 1994

[30] Foreign Application Priority Data

Mar. 25, 1993 [SE] Sweden .................. 9300998

[51] Int. Cl.$^6$ .................. B23P 25/00; B32G 31/00
[52] U.S. Cl. .................. 156/212; 156/216; 156/295; 29/458
[58] Field of Search .................. 156/212, 216, 156/291, 295; 29/458, 527.1, 527.2

[56] References Cited

U.S. PATENT DOCUMENTS

| | | |
|---|---|---|
| 4,719,689 | 1/1988 | Yamamoto .................. 156/295 |
| 5,084,119 | 1/1992 | Barksdale . | |
| 5,470,416 | 11/1995 | Herring .................. 156/216 |

FOREIGN PATENT DOCUMENTS 61-278581  12/1986  Japan .................. 156/295

*Primary Examiner*—Daniel Stemmer
*Attorney, Agent, or Firm*—Young & Thompson

[57] ABSTRACT

A process for achieving an adhesive bond in a folded joint between a first component (1) and a second component (2), preferably of sheet metal. The components (1,2) have essentially flat edge areas (3,4), and the second component (2) has a bent-up flange (5) to be bent down about the edge area (3) of the first component (1). The process comprises application of an adhesive string (8) along the surface of the second component (2), which is to lie in contact with the first component (1). The adhesive string (8) is applied a short distance from the edge flange (5), and the amount of adhesive in the adhesive string (8) is adjusted so that the adhesive, when the components (1,2) are pressed together, is forced past the edge of the first component (1) and covers the same. Furthermore, a second adhesive string (10) is applied along the surface of the first component (1), against which the edge flange (5) is bent down. The second adhesive string is placed a short distance from the edge of the first component (1) and the amount of adhesive is adjusted so that the adhesive, when the edge flange (5) is bent down, is, on the hand, pressed into contact with the adhesive in the first adhesive string (8), and, on the other hand, is made to cover the edge of the edge flange (5).

5 Claims, 1 Drawing Sheet

PROCESS FOR PRODUCING AN ADHESIVE BOND IN A FOLDER JOINT

The invention relates to a process for producing an adhesive bond in a folded joint between an inner component and an outer component, preferably of sheet metal. The inner component has an essentially flat edge area and the outer component has an essentially flat edge area with a bent-up edge flange for bending about the edge area of the inner component. The process includes the application of an adhesive string along the surface of the edge area of the one component which is intended to lie in contact with the edge area of the other component.

Folded joints are often used to join an inner component to an outer component of e.g. a hood, a door or the like in a motor vehicle. The inner component and the outer component are designed to be joined to each other by bending the edge flange of the outer component about the edge of the inner component. It is, however, difficult to make such a folded joint stable without some other bond between the components. In folded joints for motor vehicle body parts and the like an adhesive bond is often made between the inner component and the outer component. This adhesive bond has in addition to its bonding function a corrosion protection function, both in the folded joint itself and at the free edges of the inner component and the outer component.

In a previously known process for achieving an adhesive bond in a folded joint between an inner component and an outer component, a string of adhesive, usually cold epoxy adhesive, is applied to the surface of the edge area of the outer component, which surface is to be in contact with the edge area of the inner component. The outer component and the inner component are then placed together and the folding of the joint is completed. The adhesive string is laid out and pressed around the edge of the inner component, so that the edge is protected. It is, however, not possible to make the adhesive cover the entire folded-over edge flange. In order to protect the folded joint and particularly the edges of the flanges, a folded joint seal is applied, usually of a PVC-material, over the edge of the folded-over edge flange. The material also adheres to the edge area of the inner component. This gives rise, however, to an air gap enclosed in the folded joint. In the subsequent processing of the part, e.g. curing of paint or other surface treatment, the air in the enclosed space will expand and give rise to blisters and pores in the sealing material. This is very difficult to detect and the blisters and pores will make it possible for moisture to penetrate into the folded joint, thus decreasing the resistance to corrosion.

The purpose of the present invention is to provide a process which avoids the difficulties described above and achieves a completely satisfactory adhesive bond in a folded joint between an inner component and an outer component.

Figure 2:
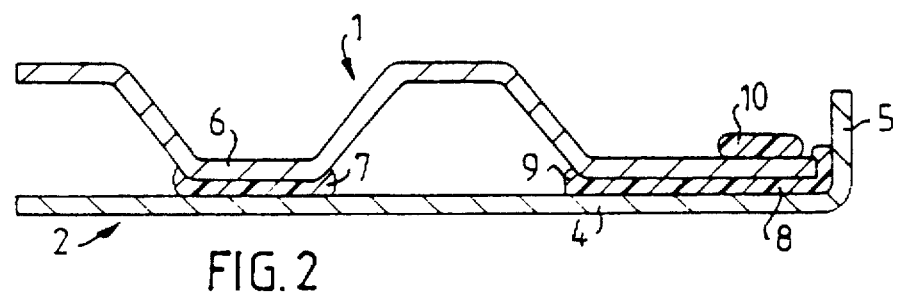
Figure 3:
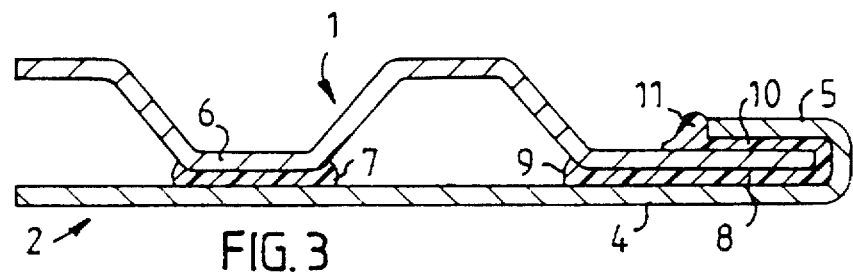
Figure 4:
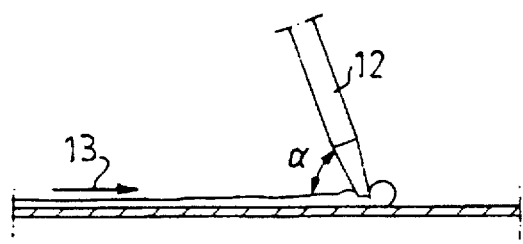
Figure 5:
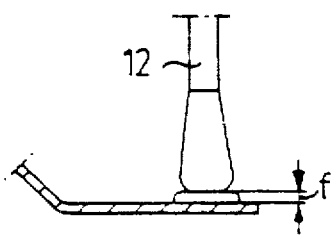

The invention will be described in more detail below with reference to the accompanying drawing, where FIG. 1 is a schematic view of two components which are designed to be joined by a folded joint and an adhesive bond in accordance with the invention, FIG. 2 is a schematic view of the components of FIG. 1 after a first joining step, FIG. 3 is a schematic view of the components of FIGS. 1 and 2 after completed joining, FIG. 4 is a schematic side view which shows a suitable placement of a nozzle for applying a string of adhesive in accordance with the invention, FIG. 5 is a schematic end view of the nozzle of FIG. 4.

FIGS. 1–3 show a first component 1 and a second component 2, which are designed to be joined by a folded joint, with an adhesive bond according to the invention provided between the first component 1 and the second component 2.

The first component 1 has an edge area 3, which is essentially flat and is designed to be applied against an edge area 4, also essentially flat, of the second component 2. The second component 2 also has a bent up edge flange 5, which is designed to be bent in over the flat edge area 3 of the first component to achieve a folded joint between the first component 1 and the second component 2. The first component 1 also has a contact area 6 for contact with another portion of the second component 2. Between the second component 2 and the contact area 6 a string 7 of adhesive sealing material is laid, in a manner known per se, to prevent the components 1 and 2 from contacting each other.

To achieve a seal in the folded joint between the first component 1 and the second component 2, an adhesive joint is made according to the invention in the folded joint. A first adhesive string 8 is applied on the side of the edge area 4 of the second component 2 which is facing the edge area 3 of the first component 1. As an alternative, the first adhesive string can be applied to the surface of the edge area 3 of the first component 1, which faces the edge area 4 of the second component 2. This placement is indicated at 8a in FIG. 1.

The first adhesive string 8 has, when used together with a first component 1 and a second component 2 of sheet metal, e.g. for car body parts, a width a of 5–15 mm and a thickness b of 1–3 mm, and is spaced a distance c from the edge flange 5 of 1–5 mm. The material in the first adhesive string 8 consists of a rubber based material, hot-melt epoxy or another equivalent material for application in a hot state, preferably at a temperature of 60 –100° C.

Then the first component 1 is placed against the second component 2, i.e. the two components are placed in the position shown in FIG. 2. The first adhesive string 8 is pressed out between the edge area 3 of the first component 1 and the edge area 4 of the second component 2. By suitable selection of the dimensions a, b and c, the first adhesive string 8 is pressed out in such a manner that, on the one hand, a portion of the adhesive is pressed up around the edge of the edge area 3 of the first component 1 to protect the edge and, on the other hand, a portion of the adhesive is forced out and forms a bead 9 at the inner portion of the edge areas 3 and 4 to prevent penetration of foreign material between the edge areas.

Prior to placing the components 1 and 2 together, a second adhesive string 10 is applied to the surface of the edge area 3 of the first component 1, against which area the edge flange 5 is to be bent. The second adhesive string 10 has a width d of 5–15 mm and a thickness e of 1–3 mm. The placement of the second adhesive string 10 is selected so that a portion of the adhesive string extends out past the portion of the edge area 3 of the first component 1, which will be covered by the edge flange 5 of the second component 2 after folding the edge flange 5 in. The projecting portion of the second adhesive string 10 is suitably selected with a width of 1–3 mm. After folding in the edge flange 5, the second adhesive string 10 will have been pressed out, firstly into contact with the first adhesive string 8, without enclosing any air whatsoever, and secondly into a second bead 11 which covers the edge of the edge flange 5 and protects the same. By virtue of the fact that the second adhesive string 10 is partially outside the edge of the edge flange 5, the material pressed out during the folding operation itself is thereby blocked. The material in the string will then move upwards and place itself as a protection against corrosion against the unprotected, cut edge of the edge flange 5. This position is shown in FIG. 3.

A nozzle 12. shown schematically in FIGS. 4 and 5, is used to apply the adhesive strings 8 and 10. The nozzle 12 has an opening which is adapted to the width of the respective adhesive string 8 or 10, and it is kept at a distance f from the underlying surface, i.e. the first component 1 or the second component 2, of 1-2 mm. The nozzle 12 is moved in one direction over the underlying surface, see the arrow 13 in FIG. 4, and is held at an angle a of 70°-80° to the already applied portion of the adhesive string. With this design and orientation of the nozzle 12, the material in the adhesive string 8 or 10 is pressed against the underlying surface, thus achieving the best possible wetting of the underlying surface, i.e. adhesion to the same.

With the process according to the invention, a folded joint is achieved which is completely protected from corrosion. No foreign matter can penetrate into the joint, and there are no blisters or pores in the joint. This means that later treatment of the components, e.g. different types of surface treatment, can not give rise to any problems in the folded joint.

The invention is not limited to the examples described above, rather variations are possible within the scope of the following claims.

We claim:

1. A process for producing an adhesive bond in a folded joint between a first component (1) and a second component (2), said first component (1) having an essentially flat edge area (3) and said second component (2) having an essentially flat edge area (4) with a bent-up edge flange (5) for bending about the edge area (3) of the first component (1), said process comprising the steps of:

application of a first adhesive string (8) on a surface of one of the edge areas (3, 4) which faces the other one of the edge areas, the first adhesive string (8) being a short distance from an edge of the first component (1) when applied thereto or from the edge flange (5) of the second component (2) when applied thereto, the amount of adhesive in the first adhesive string (8) being adjusted so that the adhesive, upon pressing together of the first component (1) and the second component (2), is forced past and covers the edge of the first component (1); and application of a second adhesive string (10) on a surface of the edge area (3) of the first component (1) against which surface the edge flange (5) of the second component (2) is to be bent, the second adhesive string (10) being a short distance from the edge of the first component (1) and applied with a portion thereof extending past the area of the first component that is covered by the edge flange of the second component after bending down the edge flange, and the amount of adhesive in the second adhesive string (10) being adapted so that the adhesive, upon bending over the edge flange (5) of the second component (2), is pressed into contact with the adhesive in the first adhesive string (8) and is made to cover the edge of the edge flange (5).

2. The process according to claim 1, wherein a width (a) of the first adhesive string (8) is between 5 and 15 mm and its thickness (b) is between 1 and 3 mm, the first adhesive string (8) being applied so that its edge is a distance (c) of 1-5 mm from the edge of the first component (1) or from the edge flange (5) of the second component (2).

3. The process according to claim 1, wherein a width (d) of the second adhesive string (10) is between 5 and 15 mm and its thickness (e) is between 1 and 3 mm.

4. The process according to claim 3, wherein the extending portion of the second adhesive string (10) has a width of 1-3 mm.

5. The process according to claim 1, wherein each of the adhesive strings (8, 10) is applied by means of a nozzle (12), which is moved along the component (1, 2) with an angle of inclination (a) of 70°-80° relative to an already applied portion of the adhesive string (8, 10).

* * * * *